Figures 1, 2, 3:
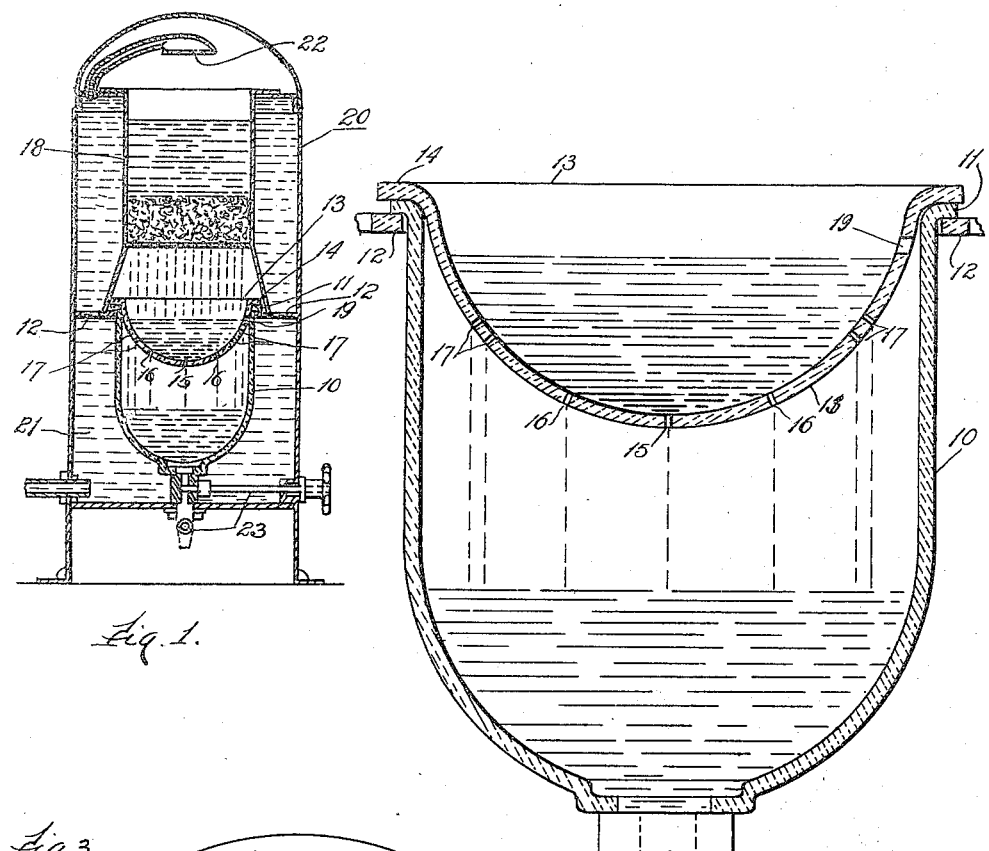

March 9, 1948.　　　　D. P. HAMLET　　　　2,437,601
FLUID MIXING DEVICE
Filed Aug. 2, 1945　　　　2 Sheets-Sheet 1

Inventor:
Darrel P. Hamlet.
by James R. McKnight
Attorney

March 9, 1948. D. P. HAMLET 2,437,601
FLUID MIXING DEVICE
Filed Aug. 2, 1945 2 Sheets-Sheet 2
Fig. 4
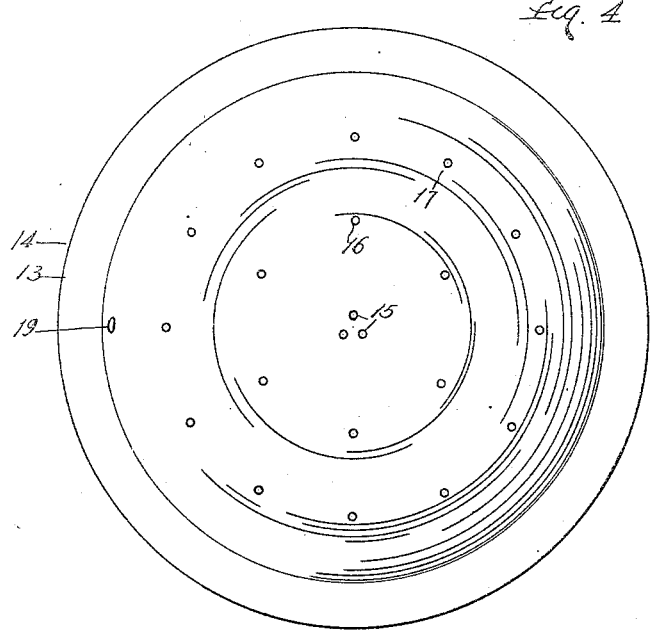
Fig. 5
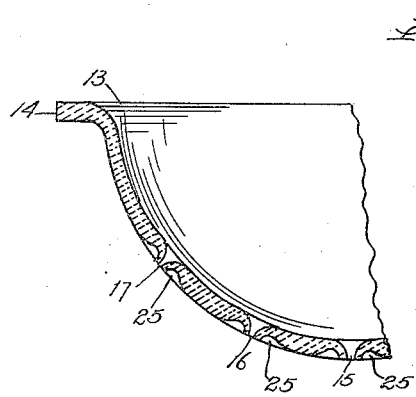
Fig. 6
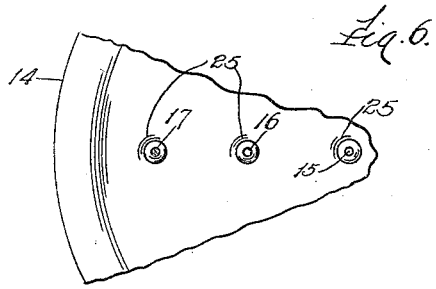
Fig. 7
Fig. 8
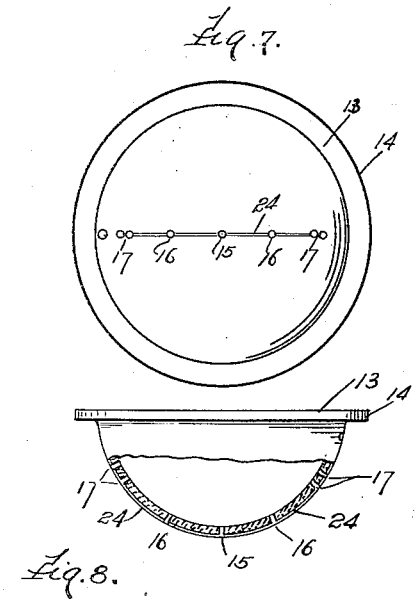
Inventor:
Darrel P. Hamlet.
by James R. McKnight
Attorney.

Patented Mar. 9, 1948

2,437,601

UNITED STATES PATENT OFFICE 2,437,601

FLUID MIXING DEVICE

Darrel P. Hamlet, Chicago, Ill., assignor to Continental Coffee Company, Chicago, Ill., a corporation of Illinois Application August 2, 1945, Serial No. 608,437

1 Claim. (Cl. 99—290)

My invention relates to a device for mixing fluids of varying characteristics to obtain a resultant uniform fluid.

Among the objects of my invention is to provide a device adapted to receive liquids of varying strengths, and to delay the passing of the stronger fluids and expedite the passing of the weaker fluids so that desired larger amounts of weaker fluids may mix with lesser quantities of stronger fluids for providing a resultant fluid of substantially uniform strength; to create a device constructed with openings of desired size and position to receive and pass fluids so as to mix the same; to eliminate the need of complicated shakers, agitators and stirring devices; to supply a mixer economical of manufacture, efficient in operation and lasting in use and such other objects, advantages and capabilities as will later more fully appear and which are inherently possessed by my invention.

While I have shown in the accompanying drawings, preferred embodiments of my invention, yet it is to be understood that the same are susceptible of modification and change without departing from the spirit of my invention.

Referring to the drawings, Fig. 1 is a vertical sectional view of a coffee urn, Fig. 2 is an enlarged detailed sectional view of my mixing device, Fig. 3 is a bottom plan view of the bowl showing the perforations, Fig. 4 is a bottom plan view of a modification of Fig. 3, Fig. 5 is a detailed sectional view showing a modification of the openings and Fig. 6 is a plan view of the disclosure shown in Fig. 5, Fig. 7 is a bottom plan view of an embodiment showing grooves between the openings and Fig. 8 is a side elevational view of the same, partly in section.

An embodiment selected to illustrate my invention as shown in Fig. 2, comprises a receptacle 10, the upper edge 11, of which is supported on a support 12. A vessel 13, preferably extending within receptacle 10, and preferably spaced high above the bottom of receptacle 10, has an upper edge 14 supported on the top of upper edge 11 of receptacle 10.

My vessel 13 is preferably concave and has opening 15 at its central bottom portion. Spaced from opening 15 are a pair of openings 16 at a higher portion of the upward curve of vessel 13. Also spaced from openings 16 and at a substantially equally higher portion of the upward curve of vessel 13 are four openings 17. The openings, 15, 16 and 17 are all preferably of the same size.

In another embodiment illustrating my invention as shown in Fig. 4, I have shown a plurality of openings 15, at the central bottom portion. For illustration I have shown three openings 15 although the number could be varied without departing from the spirit of my invention. I have also shown in this embodiment six openings 16, at a higher portion of vessel 13, and twelve openings 17 at a substantially equally higher portion of vessel 13. The number of openings 16 and 17 of the same size as openings 15 would be increased in the same ratio if there were more than three openings 15. The ratio between openings 15, 16, and 17 is therefore, substantially 1 to 2 to 4.

It is also within the contemplation of my invention that I may use one or more openings 15, 16 and 17 provided the opening or openings 16 permit the passing through of substantially twice as much liquid as the opening or openings 15 and provided the opening or openings 17 permit the passing through of substantially four times as much liquid as opening or openings 15.

Although my device may be used to mix any liquid, yet it is particularly efficacious with coffee. In the brewing of coffee, the first portion of the liquid received from the coffee maker 18 will be extremely strong; the next portion semi-strong and the latter portion very weak. As the strong liquid is received in the vessel 13, it flows to the bottom wherein is located the opening or openings 15, which must be of such a size or number as to allow the liquid to be expelled at a slower rate than it is received. This permits the liquid to accumulate so that as the semi-strong or medium liquid is received in the vessel 13, it will reach the openings 16, which are of sufficient size or number to allow the semi-strong liquid to pass at a rate slightly slower than it is received in the vessel 13. In a similar manner the weak liquid will reach and pass through openings 17. In operation substantially one drop or portion of strong liquid will pass through opening 15, two drops or portions of semi-strong liquid will pass through opening 16 and four drops of the weak liquid will pass through openings 17, simultaneously so that they may be automatically mixed as they are received in the receptacle to obtain a liquid substantially uniform in strength.

The liquid from the coffee maker 18, is regulated so that vessel 13 is promptly filled with liquid just short of exit overflow 19. When this point has been reached my device is operating with the liquid passing through openings 15, 16 and 17 at its maximum efficiency as a mixer.

The coffee urn 20, as shown in Fig. 1 has a boiler portion 21 adapted to receive and heat water. This hot water is connected to a spray 22 so that the hot water is sprayed into coffee maker 18. The hot water passes through the ground coffee in coffee maker 18 and passes into vessel 13, then into receptacle 10 from which it is withdrawn by faucet 23.

I may provide openings 16 and 17 so connected by grooves 24 with each other and opening or openings 15 as to direct liquid passing therethrough along the grooves to opening or openings 15, see Figs. 7 and 8. This will further expedite the mixing as the liquid will then tend to mix to some extent even before reaching the receptacle 10.

I have provided that vessel 13 be spaced high above the bottom of receptacle 10, so that the liquid may splash and have force to create turbulence for further mixing action.

In Figs. 5 and 6 the openings 15, 16 and 17 are curved and the outsides of the bowl adjacent the openings has recesses 25 to prevent any capillary attraction and form drops coming from openings 15, 16, and 17 to fall directly to receptacle 10.

Having thus described my invention, I claim:

In a device for making coffee of uniform strength having an urn, a coffee maker attached to the upper portion of said urn, said coffee maker adapted to hold ground coffee, means for pouring hot water into said ground coffee in said coffee maker, said coffee maker adapted to permit the coffee so made to drop therefrom, and a receptacle attached to said urn, a vessel supported below and in communication with the coffee maker and above the receptacle, said vessel having a bowl shaped body portion with upwardly diverging sides, said bowl having an opening at the bottom of said bowl, said bowl having substantially twice as many intermediate openings at a higher and wider portion as it has in its bottom, and said bowl having substantially twice as many highest openings at an equally higher and wider portion as it has intermediate openings, said opening at the bottom of the bowl being of such a small size that the strongest coffee first received in the bowl passes out of said opening at a slower rate than received, thus causing an accumulation of weaker coffee up to the intermediate openings, said intermediate openings being of such a size that the coffee at that level passes out of said intermediate openings at a slower rate than received, thus causing an accumulation of still weaker coffee up to the highest openings, said openings thereby permitting coffee of varying strengths and weaknesses to fall therethrough into said receptacle and mix in said receptacle with coffee of more uniform strength.

DARREL P. HAMLET.

REFERENCES CITED

The following references are of record in the file of this patent:

UNITED STATES PATENTS

| Number | Name | Date |
| --- | --- | --- |
| 1,762,209 | Aborn | June 10, 1930 |
| 1,946,247 | Wales | Feb. 6, 1934 |
| 2,107,923 | Adams | Feb. 8, 1938 |
| 2,269,112 | Jepson et al. | Jan. 6, 1942 |